United States Patent [19]
Creel

[11] Patent Number: 5,205,519
[45] Date of Patent: Apr. 27, 1993

[54] BOUNDARY LAYER RELAMINARIZATION DEVICE

[75] Inventor: Theodore R. Creel, Yorktown, Va.

[73] Assignee: The United States of America as represented by the United States National Aeronautics and Space Administration, Washington, D.C.

[21] Appl. No.: 823,809

[22] Filed: Jan. 7, 1992

[51] Int. Cl.$^5$ ............................................. B64C 3/58
[52] U.S. Cl. ................................... 244/198; 244/199
[58] Field of Search ............... 244/198, 199, 200, 203, 244/204, 35 A, 130

[56] References Cited

U.S. PATENT DOCUMENTS

| | | | |
|---|---|---|---|
| 2,440,198 | 4/1948 | Green | 244/203 |
| 2,885,161 | 5/1959 | Kerker et al. | 244/198 |
| 3,406,929 | 10/1968 | Young | 244/199 |
| 5,037,044 | 8/1991 | Seyfang | 244/199 |

Primary Examiner—Joseph F. Peters, Jr.
Assistant Examiner—Anne E. Bidwell
Attorney, Agent, or Firm—George F. Helfrich

[57] ABSTRACT

Relamination of a boundary layer formed in supersonic flow over the leading edge of a swept airfoil is accomplished using at least one band, especially a quadrangular band, and most preferably a square band. Each band conforms to the leading edge and the upper and lower surfaces of the airfoil as an integral part thereof and extends perpendicularly from the leading edge. Each band has a height of about two times the thickness of the maximum expected boundary layer.

4 Claims, 4 Drawing Sheets

BOUNDARY LAYER RELAMINARIZATION DEVICE

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

This invention relates generally to the reduction of total airplane drag. In particular, it relates to reducing total airplane drag by changing high drag turbulent wing leading edge flow to low drag laminar wing leading edge flow in supersonic flight regimes.

2. Description of Related Art

The destabilizing effects of leading-edge sweep on the laminar wing boundary layer at subsonic speeds have been known since the early 1950s. The dominant transition mechanisms are "attachment-line contaminations" and "crossflow instability." The problem of turbulent contamination along the attachment line of swept wings had to be addressed in the 1960s before laminar flow could be achieved at high Reynolds numbers on swept wings. (See, Pfenninger, W.: Flow Phenomena at the Leading Edge of Swept Wings. Recent Developments in Boundary Layer Research—Part IV, AGARDograph 97, May 1965; Pfenninger, W.: Laminar Flow Control-Laminarization, AGARD-R-654, March 1977, pp. 3-1-3-75; and Gaster, M.: On the Flow Along Swept Leading Edges. The Aeronautical Quarterly, Vol. XVIII, Part 2, May 1967, pp. 165–184.) In some of these studies, leading edge contamination was minimized by strong local suction and leading-edge fences with suction. In others, a faired bump protruding from the leading edge of a wind-tunnel model wing was used to prevent the spanwise propagation of turbulence along the attachment line. Wind tunnel tests of this bump attached to a cylindrical model indicated that for subsonic flight, laminar flow could be maintained at sweep angles of 60°.

Evidence of crossflow instability was first observed in flight experiments on the leading-edge portions of swept wings as regularly spaced streaks caused by variations in mass transfer from surface coatings. Gray, W. E.: The Nature of the Boundary-Layer Flow at the Nose of a Swept Wing. RAE TM Aero 256, 1952. The streaks were aligned in the local streamwise direction and were present over the upstream region preceding transition on swept-back wings. These streaks were caused by co-rotating vortices arising from the inflectional instability of the crossflow boundary-layer profiles in the upstream region of the swept wings. Gregory, N.; Stuart, J. T.; and Walker, W. S.: On the Stability of Three-Dimensional Boundary Layers with Application to the Flow Due to a Rotating Disk. Philos. Trans. Roy. Soc., London, Ser. A, Vol. 248, No. 943, 1955, pp. 155–199.

In flight, spanwise contamination may be minimized by either active or passive means. The cheapest method for avoiding turbulent attachment-line flow would be a passive device to either prevent turbulence from spreading down the leading edge, or to relaminarize an already turbulent boundary layer. Recent subsonic experimental evidence suggests several passive devices to relaminarize leading edge-flow in the subsonic region. Seyfang, G. R.: Turbulent Drag Reduction by Passive Means. Proceedings of the International Conference, London, England, Sep. 15-17, 1987, Vol. 2, London, Roy. Aero. Soc., 1987, pp. 568–601. Seyfang's wind tunnel results for a swept-wing model covered sweep angles of 25° to 75° at $M_\infty = 0.25$.

That such devices should have utility in the supersonic region is not to be expected by those of skill in the art, as it is well known that a device which is useful in the subsonic region is often not useful in the supersonic region. Moreover, it would appear that when operating in the supersonic region, a boundary layer should become more turbulent as a result of employing such devices.

SUMMARY OF THE INVENTION

It is the primary object of the present invention to provide what has been heretofore unobtainable in the prior art, viz., a device for manipulation of the flow on the leading edge of a swept airfoil at supersonic speeds in order to obtain a low drag configuration.

This object and its attending benefits are achieved by providing a band which conforms to the leading edge and the upper and lower surfaces of the swept airfoil as an integral part thereof, the band extending perpendicularly from the leading edge of the swept airfoil and having a height of about two times the thickness of the maximum expected boundary layer. Especially good results are obtained if the band is quadrangular (especially a square band). The band may be affixed to the swept airfoil by standard means (e.g., mechanical means or cementing means), or the band may be formed as a rib in the surface of the airfoil itself. Of course, a plurality of bands spaced from each other along the spanwise length of the airfoil may be employed if desired. When the supersonic flow is Mach 3.5 at a sweep angle of the swept airfoil of 76° over a freestream Reynolds number of $1.5 \times 10^5$ to $1.5 \times 10^6$, it is especially advantageous if the height of the band (preferably square) is at least 0.01 inches, and preferably 0.02 inches.

BRIEF DESCRIPTION OF THE DRAWINGS

For a more complete understanding of the present invention, including its object and attending benefits, reference should be made to the Description of the Preferred Embodiments, which is set forth below. This description should be read together with the accompanying drawings, wherein.

DESCRIPTION OF THE PREFERRED EMBODIMENTS

Figure 1:
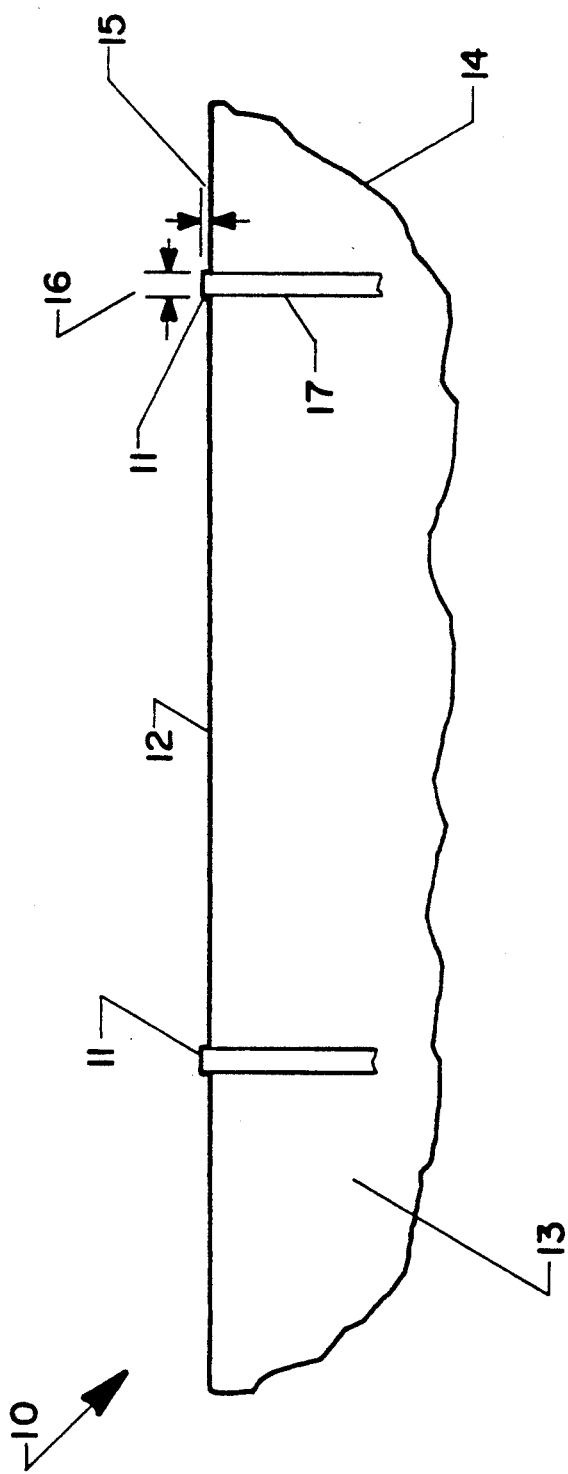
FIG. 1 is a schematic showing a preferred embodiment of a boundary layer relaminarization device according to the present invention.

Referring now to the drawing, FIG. 1 shows a preferred embodiment of a boundary layer relaminarization device according to the present invention, which is a band 11 that conforms to the leading edge 12, as well as upper surface 13 and the lower surface (not shown) of swept airfoil 14. Two such bands 11 are shown in FIG. 1, wherein the direction of supersonic airflow is shown by the arrow labeled 10. The boundary layer relaminarization device is shown as a quadrangular band 11, especially a square band, wherein height 15 equals width 16. This embodiment achieved the most beneficial results. The length 17 of band 11 may vary over a wide range without any beneficial or deleterious effect upon the results. Of course, other configurations of band 11 may be employed with some success. However, the quadrangular, especially square configuration is especially preferred. As shown in FIG. 1, band 11 extends perpendicularly from leading edge 12 of airfoil 14. As determined empirically in supersonic flow, height 15 of band 11 must be about two times the thickness of the maximum expected boundary layer to be relaminarized, in order that effective relaminarization thereof can take place. Devices which do not meet this specification are not efficacious.

Band 11 may be affixed to the leading edge 12 and upper 13 and lower (not shown) surfaces of swept airfoil 14 by standard means, such as mechanical means (riveting, bolting), or cementing means, or welding means, so that band 11 becomes an integral part of swept airfoil 14. Alternatively, band 11 may be formed as a rib in the surface of airfoil 14 in the original fabrication thereof. It is often advantageous to employ a plurality of bands 11, as shown in FIG. 1, which are spaced from each other along the spanwise length of the airfoil. See also FIG. 4 and its accompanying discussion infra. Band 11 may be fabricated from any material which can withstand the heat generated by the supersonic flow, such as steel, other metal alloys known to those of skill in the art, and high performance polymeric composites.

Employed initially was a swept cylinder model 18 (see FIGS. 2-4), which consisted of an 0.030-inch stainless steel cylindrical shell of one inch outside diameter with the upstream end sealed and cut off parallel to the freestream flow at a sweep angle of 60°. In order to withstand the aerodynamic loads, swept cylinder 18 was supported by a strong-back arrangement. Two rows of 0.01-inch diameter chromel-alumel thermocouple wires were spot-welded to the inside surface of the cylinder shell, 80° apart, and at 0.25-inch intervals along an 8.75 inch length of the shell, starting at 3.0 inches from the upstream tip of the model. The 12-inch long swept cylinder was constructed so that the shell could be rotated in 10° increments through an arc of $\theta \pm 80°$.

The surface of swept cylinder 18 was maintained clean and polished to a finish of less than 10 rms microinches. Devices 11 were tested at 60° and 76° sweep over a freestream Reynolds number range of $1.0 \times 10^5$/inch to $1.88 \times 10^6$/inch in the NASA Langley Research Center Mach 3.5 Supersonic Low-Disturbance Pilot Tunnel.

To determine whether a swept cylinder boundary layer was laminar or turbulent, computed recovery factors, as understood by those of skill in the art, were compared to the theoretical laminar value of 0.85 and to the flat-plate turbulent boundary layer value (r=0.89), as known to those of skill in the art.

Figure 2:
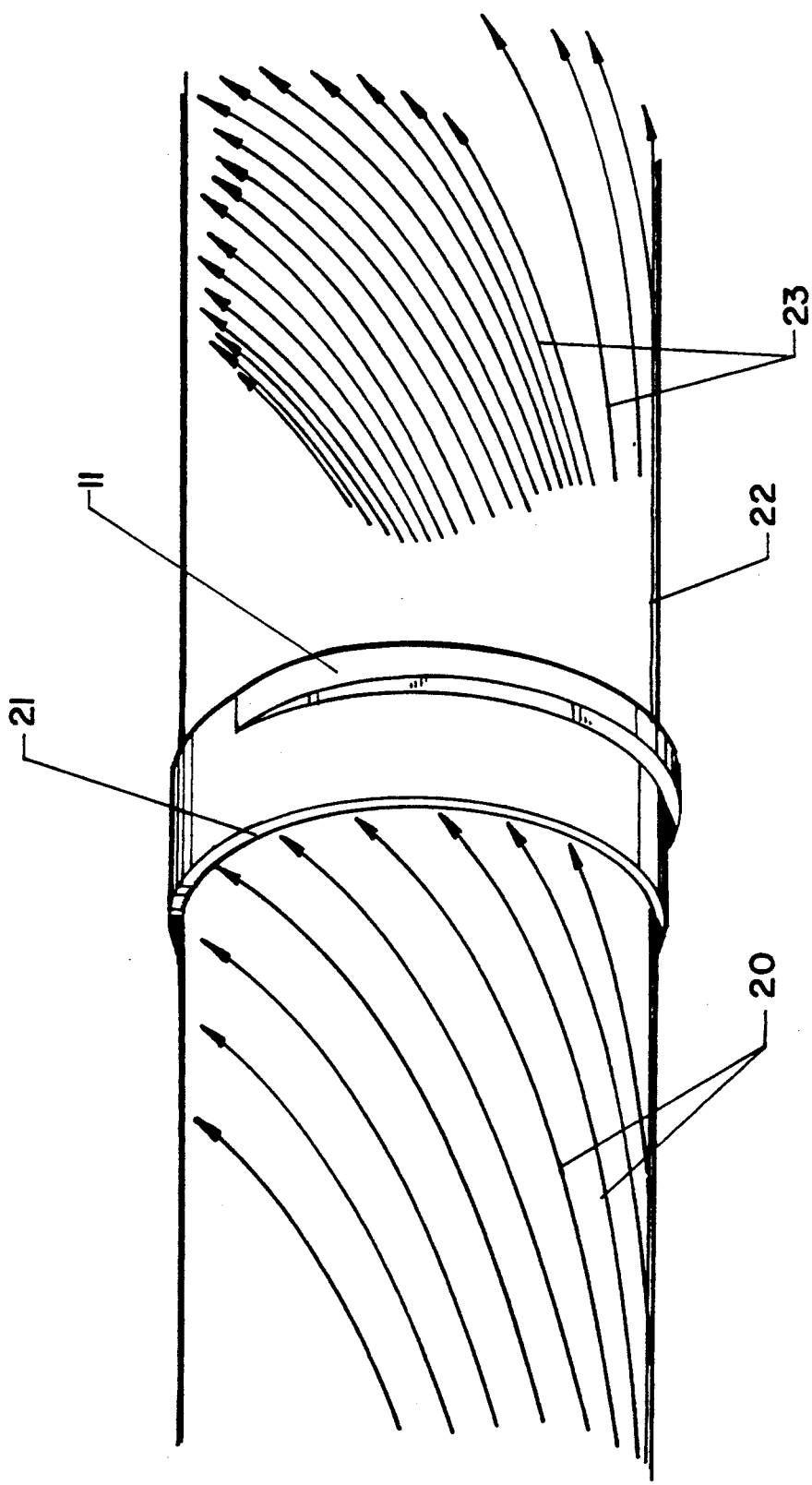
FIGS. 2 and 3 are side and top view representations of the boundary layer surface flow effects produced by the boundary layer relamination device of FIG. 1 acting on a swept cylinder model, as visualized using oil-flow techniques.
Figure 3:
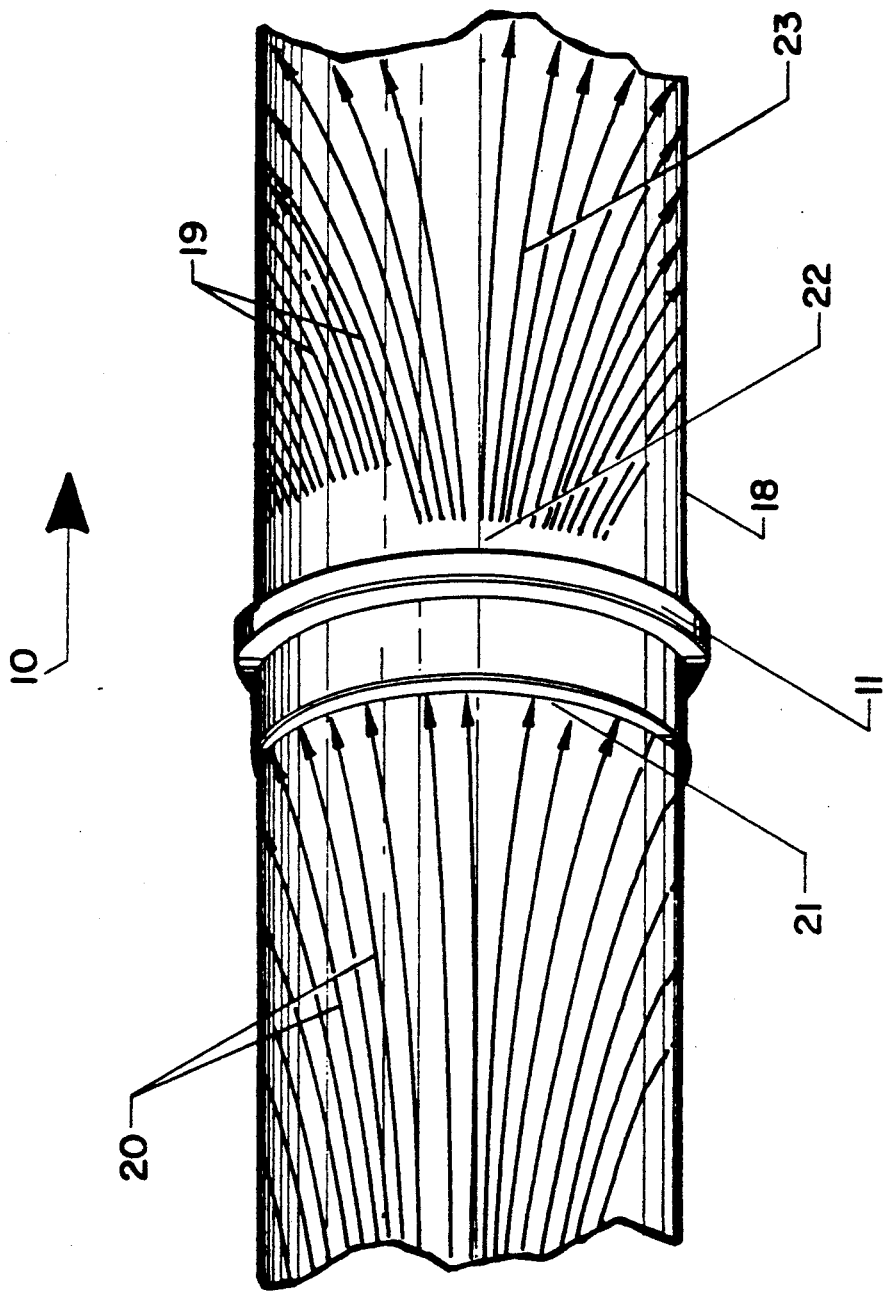

Referring now to FIGS. 2 and 3, there are shown in side and top view representations respectively the boundary layer surface flow effects produced by a boundary layer relaminarization device 11 of FIG. 1, according to the present invention, acting on swept cylinder model 18, as visualized using oil flow techniques, as described hereinafter.

A mixture for oil-flow studies was prepared by mixing two parts by volume of 350 centistokes silicon oil to one part titanium powder. A ¼-inch wide strip of the mixture was applied to the model 18 along the attachment line. The model was then mounted in the tunnel and the desired stagnation pressure was established as quickly as possible (two to three minutes) and held constant for five to ten minutes, which was sufficient to stabilize the pattern over the forward part of the model.

Representations of the typical oil-flow patterns on the cylinder 18 are shown in FIGS. 2 and 3, where evidence of crossflow vortices 19 can be seen downstream of square boundary-layer relaminarization device 11 having a height of 0.5 inches. Upstream of device 11 the crossflow vortices have been obliterated by the turbulent, boundary layer 20 at the test Reynolds number of $R_{\infty,D} = 9 \times 10^5$.

Also shown in these figures are the boundary layer separation 21 and reattachment 22 lines. At this Reynolds number, separation has occurred approximately 0.28 inches upstream of the square device 11. After the boundary layer passes over the square device 11, it reattaches approximately 0.09 inches downstream of the square device. Video recordings of the oil-flow runs show that oil is flowing radially outwardly on both sides of device 11, suggesting the formation of streamwise vortices at the square device 11. Laminar flow is seen at 23.

Figure 4:
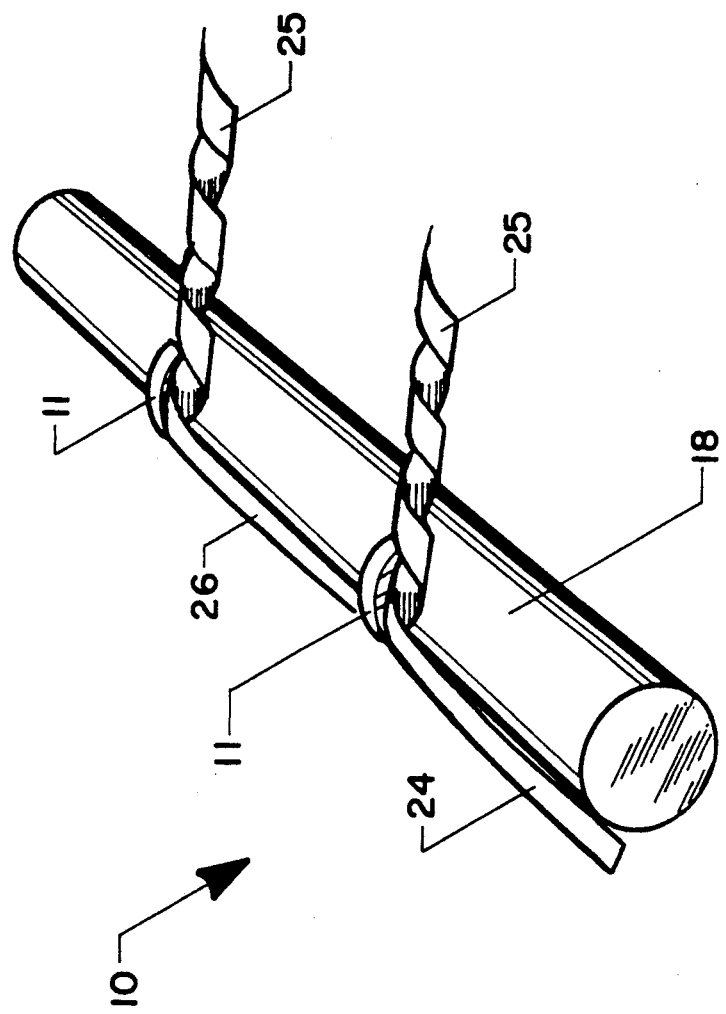
FIG. 4 is a schematic setting forth a hypothesis for the mechanism of operation of boundary layer relaminarization devices according to the present invention.

A qualitative hypothesis for the mechanism responsible for the success of relaminarization devices according to the present invention can be constructed from photographs and videotapes of the oil flow surface patterns discussed above. A graphical representation of the hypothesized flow-field in the vicinity of device 11 is shown in FIG. 4.

As turbulent attachment-line flow 24 on the leading edge approaches device 11, the obstruction presented by device 11 forces the attachment-line boundary layer to form trailing vortices 25 on either side of device 11. These vortices 25 pump the turbulent attachment-line fluid "overboard," allowing a new uncontaminated laminar attachment-line boundary layer 26 to form downstream of device 11. This process may be repeated along the leading edge with multiple devices 11, as depicted in FIG. 4.

As a result of actual testing, it has been shown that when the supersonic flow is Mach 3.5 at a sweep angle of the swept airfoil model of 76° over a freestream Reynolds number of $1.5 \times 10^5$ to $1.5 \times 10^6$, the height 15 of band 11 (especially square band 11) must be at least about 0.01 inches for relaminarization to occur. Moreover, the very best results are achieved when the height 15 of band 11 (especially square band 11) is at least about 0.02 inches, with values as high as 0.05 inches showing excellent results under these conditions.

I claim:

1. A device for relaminarization of a boundary layer formed in supersonic flow over the leading edge of a swept airfoil, the device comprising a square band conforming to the leading edge and the upper and lower surfaces of the swept airfoil as an integral part thereof, the square band being formed in the surface of the airfoil and extending perpendicularly from the leading edge and having a height of about two times the thickness of the maximum expected boundary layer.

2. A device for relaminarization of a boundary layer formed in supersonic flow over the leading edge of a swept airfoil, the device comprising a band conforming to the leading edge and the upper and lower surfaces of the swept airfoil as an integral part thereof, the band extending perpendicularly from the leading edge and having a height of about two times the thickness of the maximum expected boundary layer, wherein the supersonic flow is Mach 3.5 at a sweep angle of the swept airfoil of 76° over a free-stream Reynolds number of $1.5 \times 10^5$ to $1.5 \times 10^6$, and the height of the band is at least 0.01 inches.

3. The device of claim 2 comprising a plurality of bands spaced from each other along the spanwise length of the airfoil.

4. The device of claim 2, wherein the height of the band is about 0.02 inches.

* * * * *